US010825470B2

(12) United States Patent
Li et al.

(10) Patent No.: US 10,825,470 B2
(45) Date of Patent: Nov. 3, 2020

(54) METHOD AND APPARATUS FOR DETECTING STARTING POINT AND FINISHING POINT OF SPEECH, COMPUTER DEVICE AND STORAGE MEDIUM

(71) Applicant: BAIDU ONLINE NETWORK TECHNOLOGY (BEIJING) CO., LTD., Beijing (CN)

(72) Inventors: Chao Li, Beijing (CN); Weixin Zhu, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 119 days.

(21) Appl. No.: 16/218,178

(22) Filed: Dec. 12, 2018

(65) Prior Publication Data

US 2019/0378537 A1    Dec. 12, 2019

(30) Foreign Application Priority Data

Jun. 8, 2018  (CN) .......................... 2018 1 0587380

(51) Int. Cl.
*G10L 25/78*  (2013.01)
*G10L 15/04*  (2013.01)
(Continued)

(52) U.S. Cl.
CPC .............. *G10L 25/78* (2013.01); *G10L 15/04* (2013.01); *G10L 15/063* (2013.01); *G10L 25/30* (2013.01); *G10L 25/84* (2013.01)

(58) Field of Classification Search
CPC ......... G10L 15/04; G10L 25/30; G10L 25/78; G10L 25/84; G10L 25/87
(Continued)

(56) References Cited

U.S. PATENT DOCUMENTS 5,638,487 A * 6/1997 Chigier .................. G10L 15/04
                                                      704/202
5,826,230 A * 10/1998 Reaves .................. G10L 25/78
                                                      704/233
(Continued)

FOREIGN PATENT DOCUMENTS

CN      105118502 A     12/2015
CN      105261357 A     1/2016
(Continued)

OTHER PUBLICATIONS

Doukhan, et al. "Investigating the use of semi-supervised convolutional neural network models for speech/music classification and segmentation." Aug. 2017, pp. 1-5. (Year: 2017).*
(Continued)

*Primary Examiner* — James S Wozniak
(74) *Attorney, Agent, or Firm* — Seed IP Law Group LLP

(57) ABSTRACT

The present disclosure provides a method and apparatus for detecting a starting point and a finishing point of a speech, a computer device and a storage medium, wherein the method comprises: obtaining speech data to be detected; segmenting the speech data into speech segments, the number of speech segments being greater than one; respectively determining speech states of respective speech segments based on a Voice Activity Detection model obtained by pre-training; determining a starting point and a finishing point of the speech data according to the speech states. The solution of the present disclosure can be employed to improve the accuracy of the detection results.

8 Claims, 6 Drawing Sheets

(51) Int. Cl.
G10L 15/06 (2013.01)
G10L 25/84 (2013.01)
G10L 25/30 (2013.01)

(58) Field of Classification Search
USPC .................................................. 704/233, 253
See application file for complete search history.

(56) References Cited

U.S. PATENT DOCUMENTS

| | | | |
|---|---|---|---|
| 6,076,057 A | 6/2000 | Narayanan et al. | |
| 7,610,199 B2* | 10/2009 | Abrash | G10L 25/87 704/233 |
| 2003/0097261 A1* | 5/2003 | Jeon | G10L 25/78 704/233 |
| 2004/0260550 A1* | 12/2004 | Burges | G10L 17/00 704/259 |
| 2006/0287856 A1* | 12/2006 | He | G10L 15/063 704/256 |
| 2009/0076814 A1* | 3/2009 | Lee | G10L 25/78 704/233 |
| 2012/0072211 A1* | 3/2012 | Edgington | G10L 15/04 704/231 |
| 2012/0221330 A1* | 8/2012 | Thambiratnam | G10L 25/84 704/235 |
| 2015/0039304 A1* | 2/2015 | Wein | G10L 25/78 704/233 |
| 2017/0092297 A1 | 3/2017 | Sainath et al. | |
| 2017/0365249 A1* | 12/2017 | Dusan | G10L 25/78 |
| 2018/0012614 A1* | 1/2018 | Soleymani | G10L 19/0216 |
| 2018/0350395 A1* | 12/2018 | Simko | G10L 15/065 |
| 2019/0385636 A1* | 12/2019 | Li | G10L 15/02 |

FOREIGN PATENT DOCUMENTS

| | | |
|---|---|---|
| CN | 105869628 A | 8/2016 |
| CN | 107680585 A | 2/2018 |
| CN | 107851443 A | 3/2018 |
| JP | 2016-180839 A | 10/2016 |
| JP | 2018-517928 A | 7/2018 |
| JP | 2019-39946 A | 3/2019 |

OTHER PUBLICATIONS

Obuchi, Yasunari. "Frannewise speech-nonspeech classification by neural networks for voice activity detection with statistical noise suppression." 2016 IEEE International Conference on Acoustics, Speech and Signal Processing (ICASSP). IEEE, Mar. 2016, pp. 5715-5719. (Year: 2016).*
Saon, George, et al. "The IBM speech activity detection system for the DARPA RATS program." Interspeech. Aug. 2013, pp. 3497-3501. (Year: 2013).*
Sehgal, et al. "A convolutional neural network smartphone app for real-time voice activity detection." IEEE Access 6, Feb. 2018, pp. 9017-9026. (Year: 2018).*
Chinese Search Report, dated May 7, 2019, for Chinese Application No. 20180587380.1, 5 pages. (with English Machine Translation).
Matsui et al., "Investigation about LSTM Post-filter for Voice Activity Detection," *The Institute of Electronics, Information and Communication Engineers* 117(517):6,45-50, 2018. (with English abstract) (8 page).

* cited by examiner

METHOD AND APPARATUS FOR DETECTING STARTING POINT AND FINISHING POINT OF SPEECH, COMPUTER DEVICE AND STORAGE MEDIUM

CROSS-REFERENCE TO RELATED APPLICATION(S)

The present application claims the priority of Chinese Patent Application No. 201810587380.1, filed on Jun. 8, 2018, with the title of "Method and apparatus for detecting starting point and finishing point of speech, computer device and storage medium." The disclosure of the above applications is incorporated herein by reference in its entirety.

BACKGROUND

Technical Field

The present disclosure relates to speech processing technologies, and particularly to a method and apparatus for detecting a starting point and a finishing point of a speech, a computer device and a storage medium.

Description of the Related Art

Along with development of technologies, there arise various products having a speech interaction function, for example, a smart loudspeaker box, smart TV set and smart refrigerator.

A very important point in speech interaction is capability of detecting a starting point and a finishing point of a speech.

Necessity of detecting the starting point lies in extracting real speech. For example, a smart loudspeaker box is always in a standby state and monitors speech in the environment all the time; if speech recognition processing is performed for each frame of speech data, very large power consumption will be undoubtedly caused to the system; detection of the starting point of the speech may enable the system to only concern segments in which people speak, without processing other segments for example noise segments.

The necessity of detecting the finishing point lies in that when a user speaks out his request, the system needs to quickly give a response, and the user might complain "the system responds so slowly" in the case of delay. For example, if the user speaks out his request "Beijing's weather of today", the user hopes that after the speaking out of the request, the system can tell him "Beijing's whether is cloudy" or the like in time.

In the prior art, there are proposed various methods for detecting the starting point and finishing point, for example, a signal processing-based method, a method of using a classification model for detection, and the like. However, these methods are much prone to detection errors, for example, misreporting and missed reporting of the starting point and misreporting and missed reporting of the finishing point.

The misreporting of the starting point includes: classifying noise segments as speech, transmitting the noise to a background speech recognizer, and thereby increasing the power consumption of the system, and increasing streaming if the background service is at the cloud.

Missed reporting of the starting point includes: the starting point of the speech is not detected, so no speech is transferred to the background speech recognizer. Such case happens now and then. For example, if the user speaks in a very low voice, the user's low voice is wrongly processed as background noise so that the background speech recognizer cannot receive any speech.

The misreporting of the finishing point includes: ending in advance, namely, the speech is considered as ending when the user has not yet completed speech. Such case mostly occurs on occasions when the user speaks with "strong beginning and weak ending". For example, the user's voice gets lower and lower, or the user has a longer pause, for example, after speaking out "Beijing's weather of today", the user takes a breath and then speaks "is the weather suitable for mountain climbing?" If the detection of the finishing point is too sensitive, the user's speech will be processed in two sentences.

The missed reporting of the finishing point includes: not ending in a long period of time. Such case mostly occurs on occasions with noisy environment. Although the user's speaking ends up, since the noise from the background is very large, the speaking is not cut off. A resultant consequence is that after the user finishes speaking "what about Beijing's weather today", he awaits the system to offer a response for a long time period.

The accuracy of detection results is lowered in case of occurrence of either misreporting or missed reporting.

BRIEF SUMMARY

In view of the above, the present disclosure provides a method and apparatus for detecting a starting point and a finishing point of a speech, a computer device and a storage medium.

Specific technical solutions are as follows:

A method for detecting a starting point and a finishing point of a speech, comprising:
  obtaining speech data to be detected;
  segmenting the speech data into speech segments, the number of speech segments being greater than one;
  respectively determining speech states of respective speech segments based on a Voice Activity Detection model obtained by pre-training;
  determining a starting point and a finishing point of the speech data according to the speech states.

According to a preferred embodiment of the present disclosure, there is overlap between at least two adjacent speech segments.

According to a preferred embodiment of the present disclosure, the Voice Activity Detection model comprises a convolutional neural network model.

According to a preferred embodiment of the present disclosure, the respectively determining speech states of respective speech segments based on a Voice Activity Detection model obtained by pre-training comprises:
  using the Voice Activity Detection model to classify the speech segments;
  based on output of the Voice Activity Detection model, using a Viterbi decoding algorithm to determine the speech states of the speech segments.

According to a preferred embodiment of the present disclosure, training to obtain the Voice Activity Detection model comprises:
  obtaining speech data as training data;
  extracting sample segments in N different speech states respectively from the obtained each piece of speech data, N being a positive integer greater than one;
  training according to the extracted sample segments to obtain the speech activity detection model.

According to a preferred embodiment of the present disclosure, the extracting sample segments in N different speech states respectively from the obtained each piece of speech data comprises:
for each piece of speech data, obtaining speech frame and non-speech frame annotation results of the speech data respectively;
according to the annotation results, extracting sample segments in N different speech states from the speech data.

According to a preferred embodiment of the present disclosure, the speech states comprise:
a mute state, a starting point state, a speech retention state and a finishing point state.

According to a preferred embodiment of the present disclosure, the extracting sample segments in N different speech states respectively from the obtained each piece of speech data comprises:
randomly extracting sample segments in N different speech states respectively from the obtained each piece of speech data;
wherein in the sample segment in the starting point state, the starting point of the speech is located in a first half of the sample segment, and a distance from the starting point of the sample segment is greater than a predetermined threshold;
in the sample segment in the finishing point state, the finishing point of the speech is located in a first half of the sample segment, and a distance from the starting point of the sample segment is greater than a predetermined threshold.

According to a preferred embodiment of the present disclosure, the determining a starting point and a finishing point of the speech data according to the speech states comprises:
determining the starting point and the finishing point of the speech data according to a first speech segment in the starting point state and a first speech segment in the finishing point state in the speech data.

An apparatus for detecting a starting point and a finishing point of a speech, comprising: a detection module comprising a first obtaining unit, a segmenting unit and a determining unit;
the first obtaining unit is configured to obtain speech data to be detected;
the segmenting unit is configured to segment the speech data into speech segments, the number of speech segments being greater than one;
the determining unit is configured to respectively determine speech states of respective speech segments based on a Voice Activity Detection model obtained by pre-training, and determine a starting point and a finishing point of the speech data according to the speech states.

According to a preferred embodiment of the present disclosure, there is overlap between at least two adjacent speech segments.

According to a preferred embodiment of the present disclosure, the Voice Activity Detection model comprises a convolutional neural network model.

According to a preferred embodiment of the present disclosure, the determining unit uses the Voice Activity Detection model to classify the speech segments, and based on output of the Voice Activity Detection model, use a Viterbi decoding algorithm to determine the speech states of the speech segments.

According to a preferred embodiment of the present disclosure, the apparatus further comprises a training module;
the training module comprises a second obtaining unit, an extracting unit and a training unit;
the second obtaining unit is configured to obtain speech data as training data;
the extracting unit is configured to extract sample segments in N different speech states respectively from the obtained each piece of speech data, N being a positive integer greater than one;
the training unit is configured to train according to the extracted sample segments to obtain the speech activity detection model.

According to a preferred embodiment of the present disclosure, the extracting unit is further configured to, for each piece of speech data, obtain speech frame and non-speech frame annotation results of the speech data respectively, and, according to the annotation results, extract sample segments in N different speech states from the speech data.

According to a preferred embodiment of the present disclosure, the speech states comprise:
a mute state, a starting point state, a speech retention state and a finishing point state.

According to a preferred embodiment of the present disclosure, the extracting unit randomly extracts sample segments in N different speech states respectively from the obtained each piece of speech data;
wherein in the sample segment in the starting point state, the starting point of the speech is located in a first half of the sample segment, and a distance from the starting point of the sample segment is greater than a predetermined threshold;
in the sample segment in the finishing point state, the finishing point of the speech is located in a first half of the sample segment, and a distance from the starting point of the sample segment is greater than a predetermined threshold.

According to a preferred embodiment of the present disclosure, the determining unit determines the starting point and the finishing point of the speech data according to a first speech segment in the starting point state and a first speech segment in the finishing point state in the speech data.

A computer device, comprising a memory, a processor and a computer program which is stored on the memory and runs on the processor, the processor, upon executing the program, implementing the above-mentioned method.

A computer-readable storage medium on which a computer program is stored, the program, when executed by the processor, implementing the aforesaid method.

As can be seen from the above introduction, according to solutions of the present disclosure, after the speech data to be detected is obtained, it is possible to first segment the speech data into a plurality of speech segments, and then determine the speech states of respective speech segments based on the pre-trained Voice Activity Detection model, and then determine the starting point and finishing point of the speech data according to the speech states. As compared with the prior art, in the solutions of the present disclosure, detection of the starting point and the finishing point is performed in conjunction with classification of segment classes and a deep learning model, thereby improving the accuracy of the detection results.

DETAILED DESCRIPTION

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
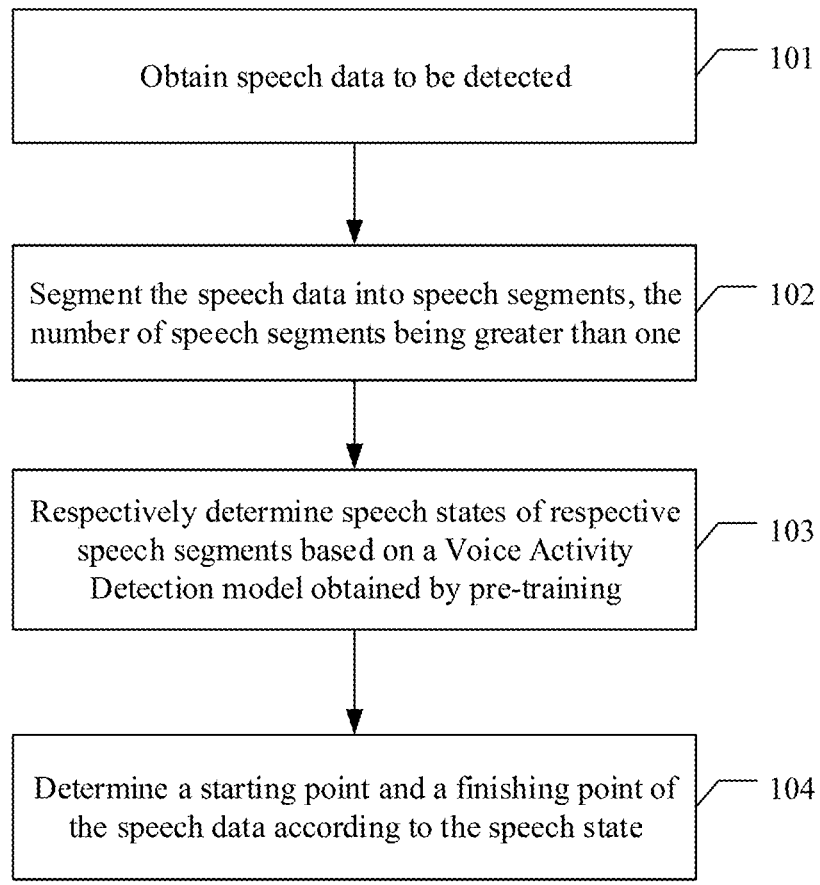
FIG. 1 is a flow chart of an embodiment of a method of detecting a starting point and a finishing point of a speech according to the present disclosure.

FIG. 1 is a flow chart of an embodiment of a method of detecting a starting point and a finishing point of a speech according to the present disclosure. As shown in FIG. 1, the embodiment comprises the following specific implementation mode.

In 101 is obtained speech data to be detected.

In 102, the speech data is segmented into speech segments, the number of speech segments being greater than one.

In 103, respectively determine speech states of respective speech segments based on a Voice Activity Detection (VAD) model obtained by pre-training.

In 104, determine a starting point and a finishing point of a speech data according to the speech states.

A speech data usually includes the following four states:
mute, which might include noise;
a starting point of the speech, where the user begins to speak;
retention of the speech, during which the user speaks all the time possibly with weak pauses;
a finishing point of the speech, where the user's speech ends.

Figure 2:
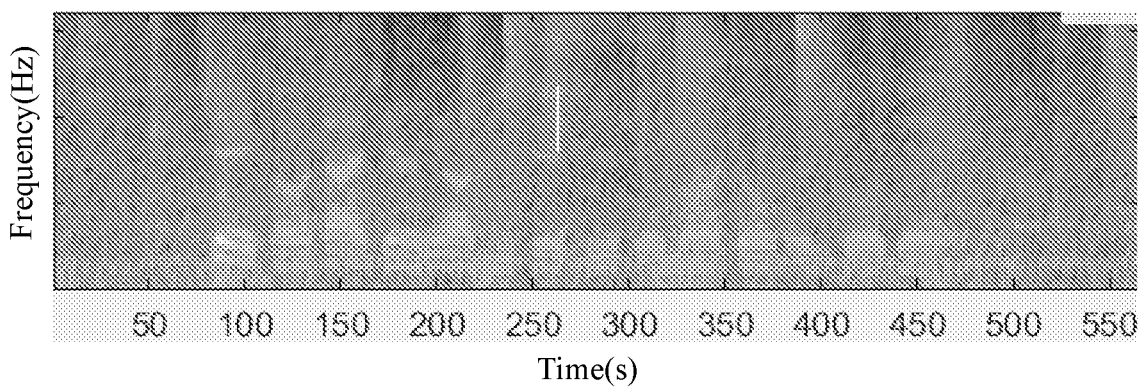
FIG. 2 is a speech spectrogram of a speech data in the prior art.
Figure 3:
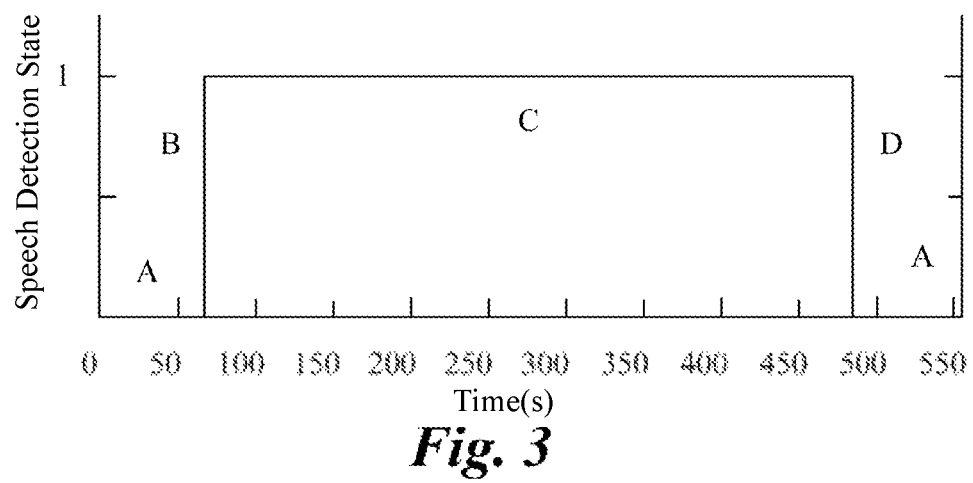
FIG. 3 is a schematic diagram of states of the present disclosure.

FIG. 2 is a speech spectrogram of a speech data in the prior art. FIG. 3 is a schematic diagram of states of the present disclosure. As shown in FIG. 3, with respect to the speech spectrogram shown in FIG. 2, 1 may be used to represents that the user speaks, 0 used to represent that the user does not speak, A, B, C and D are used to represent states such as mute, the starting point of the speech, retention of the speech, and the finishing point of the speech in turn.

To implement the process shown in FIG. 1, it is necessary to first perform model training, namely, train to obtain the Voice Activity Detection model. The training process is training by arranging and abstracting training data to obtain a model converging on a training set. Then, it is possible to use the trained model in practical use to perform detection of the starting point and finishing point of the speech.

As shown in FIG. 3, usually in a speech data, the mute state A and the speech retention state C both have a longer duration, and there is only one starting point state B and only one finishing point state D. Therefore, if the whole speech data is used for training, this is very unfavorable for the two states B and D, and price produced by them can easily be covered by A and C. To this end, in the present embodiment, it is possible to employ classification of segment classes, as a basis for performing training and detection.

To train and obtain the Voice Activity Detection model, it is possible to first obtain the speech data as the training data, then extract sample segments in N different speech states respectively from the obtained each speech data, N being a positive integer greater than one, and train according to the extracted sample segments to obtain the speech activity detection model.

A specific value of N may depend on actual needs. Preferably, as stated above, the value of N may be four. Four speech states may be: the mute state, the starting point state, the speech retention state and the finishing point state.

For example, it is possible to obtain 10,000 pieces of speech data, each piece being in a length of about several seconds. For each piece of speech data, it is possible to first obtain speech frame and non-speech frame annotation results of the speech data respectively. It is possible to obtain the annotation results in a manual annotation manner, or in a machine forced alignment manner in speech recognition. The speech frame may be annotated as 1, and non-speech frame may be annotated as 0.

Then, it is possible to, according to the annotation results, extract sample segments in four different speech states respectively from each speech data. A specific extracting manner may be shown below.

1) The Sample Segment in the Mute State

Figure 4:
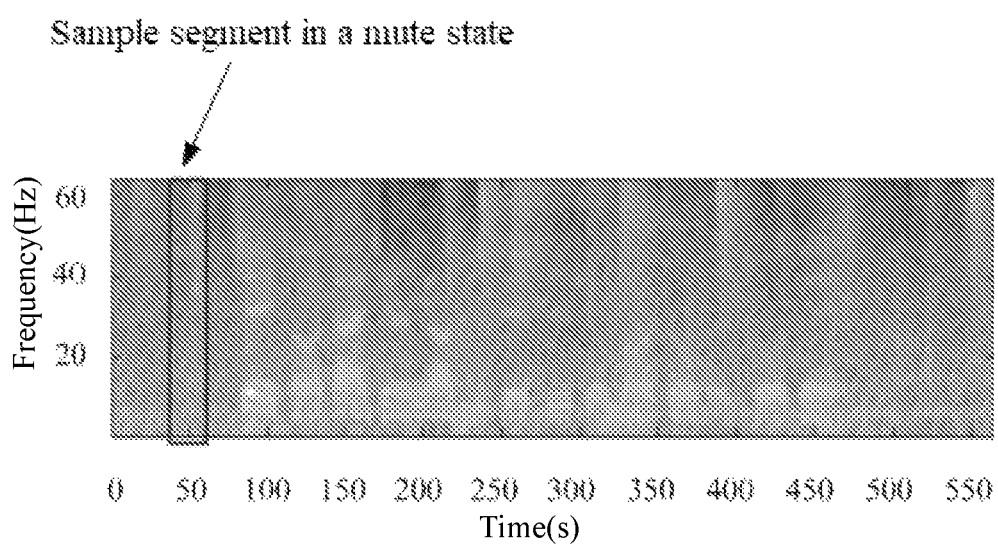
FIG. 4 is a schematic diagram of a manner of extracting a sample segment in a mute state according to the present disclosure.

FIG. 4 is a schematic diagram of a manner of extracting a sample segment in a mute state according to the present disclosure. As shown in FIG. 4, it is possible to extract one mute segment randomly from the speech data, as the sample segment in the mute state. The sample segment is formed by a frame annotated with 0.

2) The Sample Segment in the Starting Point State

Figure 5:
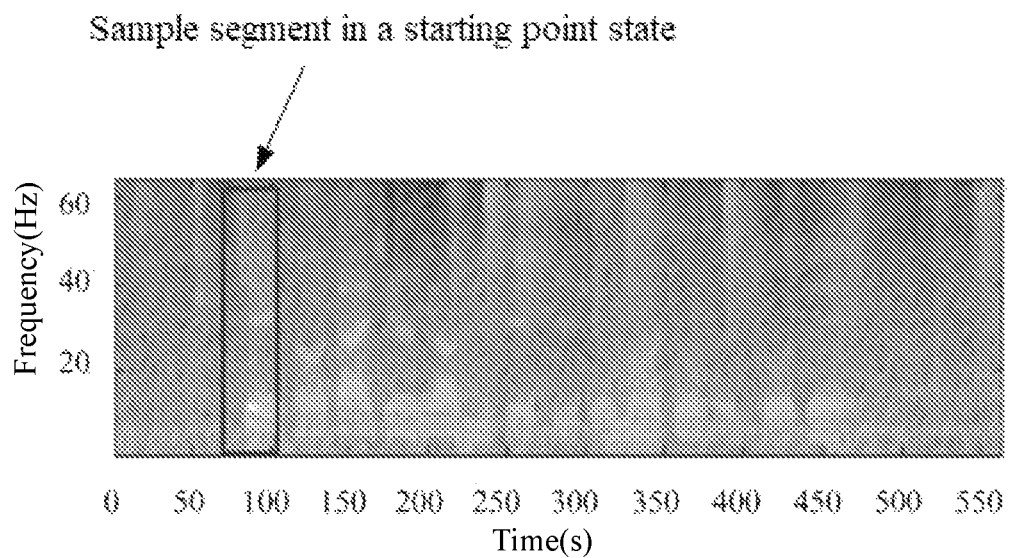
FIG. 5 is a schematic diagram of a manner of extracting a sample segment in a starting point state according to the present disclosure.

FIG. 5 is a schematic diagram of a manner of extracting a sample segment in a starting point state according to the present disclosure. As shown in FIG. 5, it is possible to extract a segment including a speech starting point randomly from the speech data, as the sample segment in the starting point state. The sample segment is formed by frames annotated with 0 and 1.

Preferably, the starting point of the speech is located in a first half of the sample segment, and a distance from the starting point of the sample segment is greater than a predetermined threshold, that is, the starting point of the speech needs to be located in the first half of the sample segment, but not too far forward, for example, may be located in a range of 0.25-0.5, 0.25 represents ¼ of a length of the sample segment, and 0.5 represents ½ of the length of the sample segment.

Experiments show that the sample fragment obtained in the above manner is more suitable for subsequent model training, and can better improve the model training effect.

3) Sample Segment in the Voice Retention State

Figure 6:
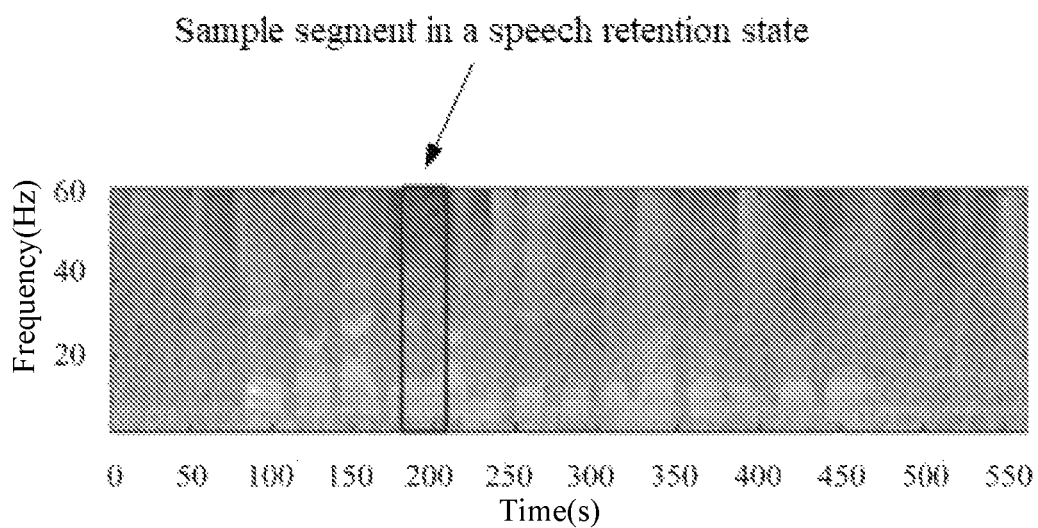
FIG. 6 is a schematic diagram of a manner of extracting a sample segment in a speech retention state according to the present disclosure.

FIG. 6 is a schematic diagram of a manner of extracting a sample segment in a speech retention state according to the present disclosure. As shown in FIG. 6, it is possible to extract one speech segment randomly from the speech data, as the sample segment in the speech retention state. The sample segment is formed by a frame annotated with 1.

4) Sample Segment in the Finishing Point State

Figure 7:
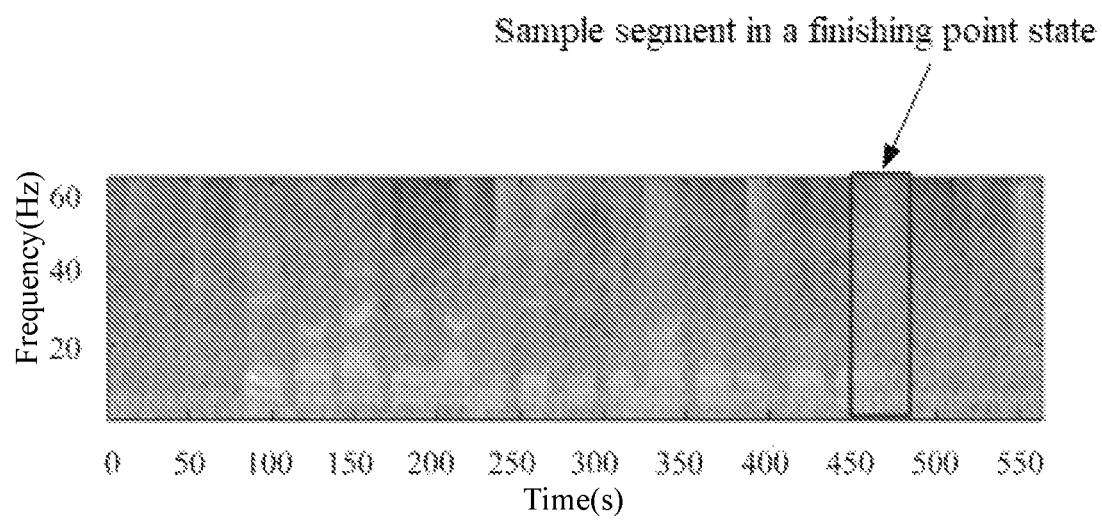
FIG. 7 is a schematic diagram of a manner of extracting a sample segment in a finishing point state according to the present disclosure.

FIG. 7 is a schematic diagram of a manner of extracting a sample segment in a finishing point state according to the present disclosure. As shown in FIG. 7, it is possible to extract a segment including a speech finishing point randomly from the speech data, as the sample segment in the finishing point state. The sample segment is formed by frames annotated with 0 and 1.

Preferably, the speech finishing point is located in the first half of the sample segment, and a distance from the starting point of the sample segment is greater than a predetermined threshold, that is, the speech finishing point needs to be located in the first half of the sample segment, but not too far forward, for example, may be located in a range of 0.25-0.5, 0.25 represents ¼ of the length of the sample segment, and 0.5 represents ½ of the length of the sample segment.

Figure 8:
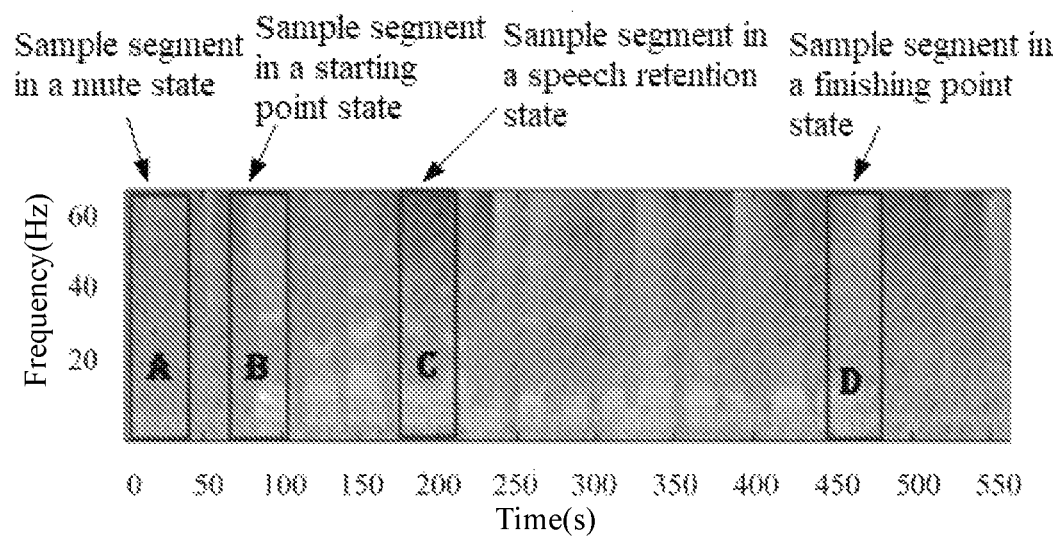
FIG. 8 is a schematic diagram of extracted four sample segments according to the present disclosure.

FIG. 8 is a schematic diagram of extracted four sample segments according to the present disclosure. As shown in FIG. 8, the extracted sample segments are gathered to obtain four sample segments, which are a sample segment in the mute state, a sample segment in the starting point state, a sample segment in the speech retention state, and a sample segment in the finishing point state respectively.

As such, for each piece of speech data, four sample segments can be obtained. Further, it is possible to, with respect to each sample segment, generate a training pair {x, y}, where x is a feature and y is a label, namely, a speech status (classification result).

The features, the length of each sample segment, and the like may be determined according to actual needs, and the length of each sample segment may be the same.

For example, it is possible to employ a feature having a 25 ms frame length, a 10 ms frame shift, and a 64-dimensional mel filterbank. Of course, the frame length and frame shift can also be other values, and the features can also be replaced by other acoustic features such as Mel-frequency Cepstrum Coefficients (MFCC), Perceptual Linear Predictive (PLP) Coefficient, etc. In addition, it is possible to employ context=32, or larger. In principle, the larger the context is, a larger accuracy will be achieved, but this will cause time delay.

After all the speech data are processed, a full training pair can be obtained, and the Voice Activity Detection model can be obtained by training according to the full training pair.

A deep neural network may be used as the Voice Activity Detection model. Preferably, a Convolutional Neural Network (CNN) model may be used. The network is made up of multi-layer cnn, an output layer is 4 nodes, softmax is used as the activation, and cross entropy is used as a cost function. How to perform training is of the prior art.

After the training of the Voice Activity Detection model is completed, the model may be used to perform actual detection of the speech starting point and finishing point.

Specifically, after the speech data to be detected is obtained, it is possible to first segment the speech data into a plurality of speech segments, and then determine the speech states of respective speech segments based on the Voice Activity Detection model, and then determine the starting point and finishing point of the speech data according to the speech states.

The speech data to be detected may be segmented into a plurality of overlapping speech segments, that is, there is overlap between at least two adjacent speech segments. For example, every 32 frames may be used as a speech segment, and one such speech segment is taken every 8 frames, that is, the first to the $32^{nd}$ frames are used as a speech segment, the 9th to $40^{th}$ frames are used as a speech segment, and so on.

It is possible to classify respective speech segments resulting from segmentation by respectively using the Voice Activity Detection model, and based on the output of the Voice Activity Detection model, use a Viterbi decoding algorithm to determine the speech state of the speech segment.

Specifically, it is possible to obtain the feature of the speech segment, input the obtained feature into the Voice Activity Detection model in the four states for classification to obtain a probability output h, then based on the probability output h, use the Viterbi decoding algorithm to determine the speech state of the speech segment. The Viterbi decoding algorithm is a standard Viterbi decoding algorithm. Specific implementation is of the prior art.

For a normal speech data, it will go through the following stages: the mute state—the starting point state—the speech retention state—the finishing point state. The jump of each state must be continuous.

Correspondingly, the starting point and the finishing point of the speech data may be determined according to a first speech segment in the starting point state and a first speech segment in the finishing point state in the speech data. For example, the first speech segment in the starting point state and the first speech segment in the finishing point state and the speech data between the two are extracted as real speech, for subsequent processing such as speech recognition.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

To sum up, in the solution of the above method embodiment, detection of the starting point and the finishing point is performed in conjunction with classification of segment classes and a deep learning model, thereby improving the accuracy of the detection results.

The above introduces the method embodiments. The solution of the present disclosure will be further described through an apparatus embodiment.

Figure 9:
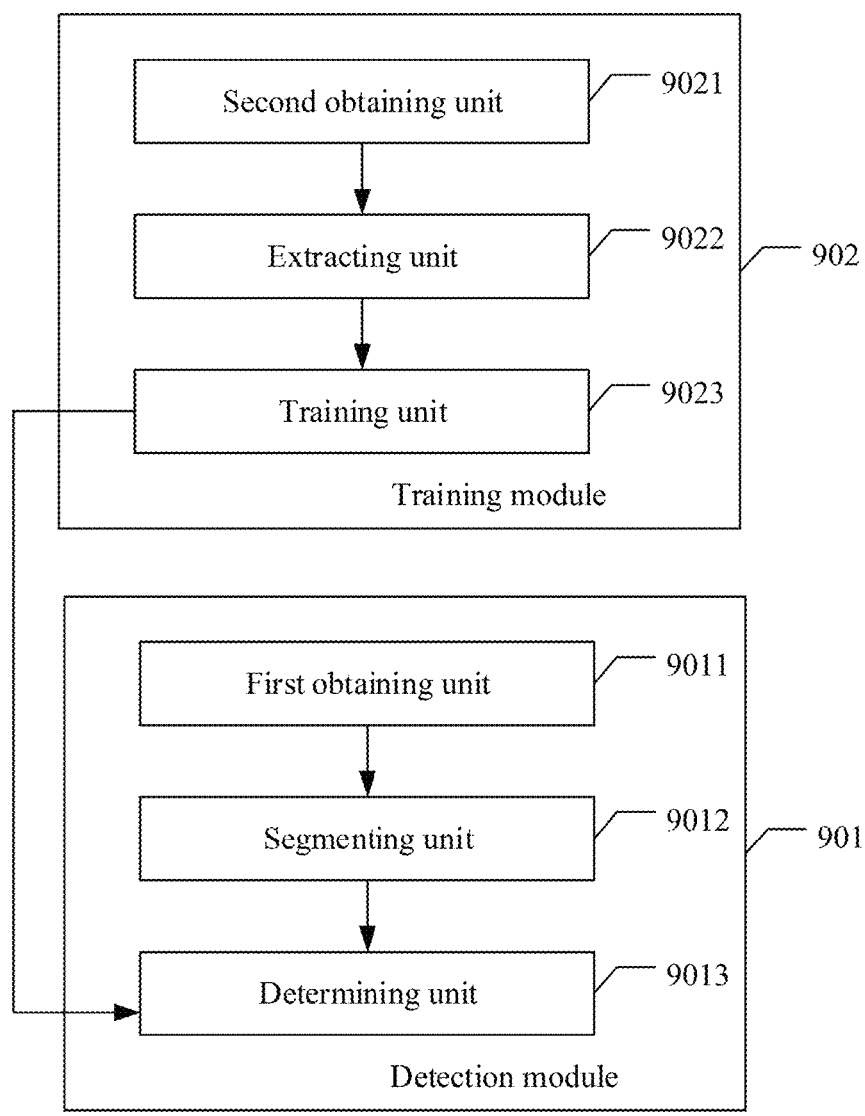
FIG. 9 is a structural schematic diagram of an apparatus for detecting a starting point and a finishing point of a speech according to the present disclosure.

FIG. 9 is a structural schematic diagram of an apparatus for detecting a starting point and a finishing point of a speech according to the present disclosure. As shown in FIG. 9, the apparatus comprises: a detection module 901. The detection module 901 may specifically comprise: a first obtaining unit 9011, a segmenting unit 9012 and a determining unit 9013.

The first obtaining unit 9011 is configured to obtain speech data to be detected.

The segmenting unit 9012 is configured to segment the speech data into speech segments, the number of speech segments being greater than one.

The determining unit 9013 is configured to respectively determine speech states of respective speech segments based on a Voice Activity Detection model obtained by pre-training, and determine a starting point and a finishing point of the speech data according to the speech states.

To implement the above operations, it is necessary to first perform model training, namely, train to obtain the Voice Activity Detection model. Correspondingly, the apparatus shown in FIG. 7 further comprises: a training module 902. The training module 902 may specifically comprise: a second obtaining unit 9021, an extracting unit 9022 and a training unit 9023.

The second obtaining unit 9021 is configured to obtain speech data as training data.

The extracting unit 9022 is configured to extract sample segments in N different speech states respectively from the obtained each speech data, N being a positive integer greater than one.

The training unit 9023 is configured to train according to the extracted sample segments to obtain the speech activity detection model.

A specific value of N may depend on actual needs. Preferably, the value of N may be four. Four speech states may be: the mute state, the starting point state, the speech retention state and the finishing point state.

For example, the second obtaining unit 9021 may obtain 10,000 pieces of speech data, each piece being in a length of about several seconds. For each piece of speech data, the extracting unit 9022 may first obtain speech frame and non-speech frame annotation results of the speech data respectively, for example, the speech frame may be annotated as 1, and non-speech frame may be annotated as 0, then, the extracting unit 9022 may according to the annotation results, extract sample segments in four different speech states from the speech data.

The extracting unit 9022 may respectively extract sample segments in four different speech states randomly from the obtained each piece of speech data, namely, a sample segment in a mute state, a sample segment in a starting point state, a sample segment in a speech retention state, and a sample segment in a finishing point state.

In the sample segment in the starting point state, the starting point of the speech is located in a first half of the sample segment, and a distance from the starting point of the sample segment is greater than a predetermined threshold. In the sample segment in the finishing point state, the finishing point of the speech is located in a first half of the sample segment, and a distance from the starting point of the sample segment is greater than a predetermined threshold.

As such, for each piece of speech data, four sample segments can be obtained. Further, the training unit 9023 may, with respect to each sample segment, generates a training pair $\{x, y\}$, where x is a feature and y is a label, namely, a speech status (classification result), and may obtain a full training pair after all the speech data are processed, and then train according to the full training pair to obtain the Voice Activity Detection model.

A deep neural network may be used as the Voice Activity Detection model. Preferably, a Convolutional Neural Network model may be used.

After the training of the Voice Activity Detection model is completed, the model may be used to perform actual detection of the speech starting point and finishing point.

After obtaining the speech data to be detected from the first obtaining unit 9011, the segmenting unit 9012 may segment the speech data into a plurality of speech segments, and then the determining unit 9013 may determine the speech states of respective speech segments based on the Voice Activity Detection model, and then determine the starting point and finishing point of the speech data according to the speech states.

The segmenting unit 9012 may segment the speech data to be detected into a plurality of overlapping speech segments, that is, there is overlap between at least two adjacent speech segments. For example, every 32 frames may be used as a speech segment, and one such speech segment is taken every 8 frames.

The determining unit 9013 may use the Voice Activity Detection model to classify respective speech segments resulting from segmentation, and based on the output of the Voice Activity Detection model, use a Viterbi decoding algorithm to determine the speech states of the speech segments.

Specifically, it is possible to obtain the feature of the speech segment, input the obtained feature into the Voice Activity Detection model in the four states for classification to obtain a probability output h, then based on the probability output h, use the Viterbi decoding algorithm to determine the speech state of the speech segment. The Viterbi decoding algorithm is a standard Viterbi decoding algorithm. Specific implementation is of the prior art.

Furthermore, the determining unit 9013 may determine the starting point and the finishing point of the speech data according to a first speech segment in the starting point state and a first speech segment in the finishing point state in the speech data. For example, the first speech segment in the starting point state and the first speech segment in the finishing point state and the speech data between the two are extracted as real speech, for subsequent processing such as speech recognition.

Reference may be made to corresponding depictions in the aforesaid method embodiment for a specific workflow of the apparatus embodiment shown in FIG. 9. The workflow is not detailed any more.

Figure 10:
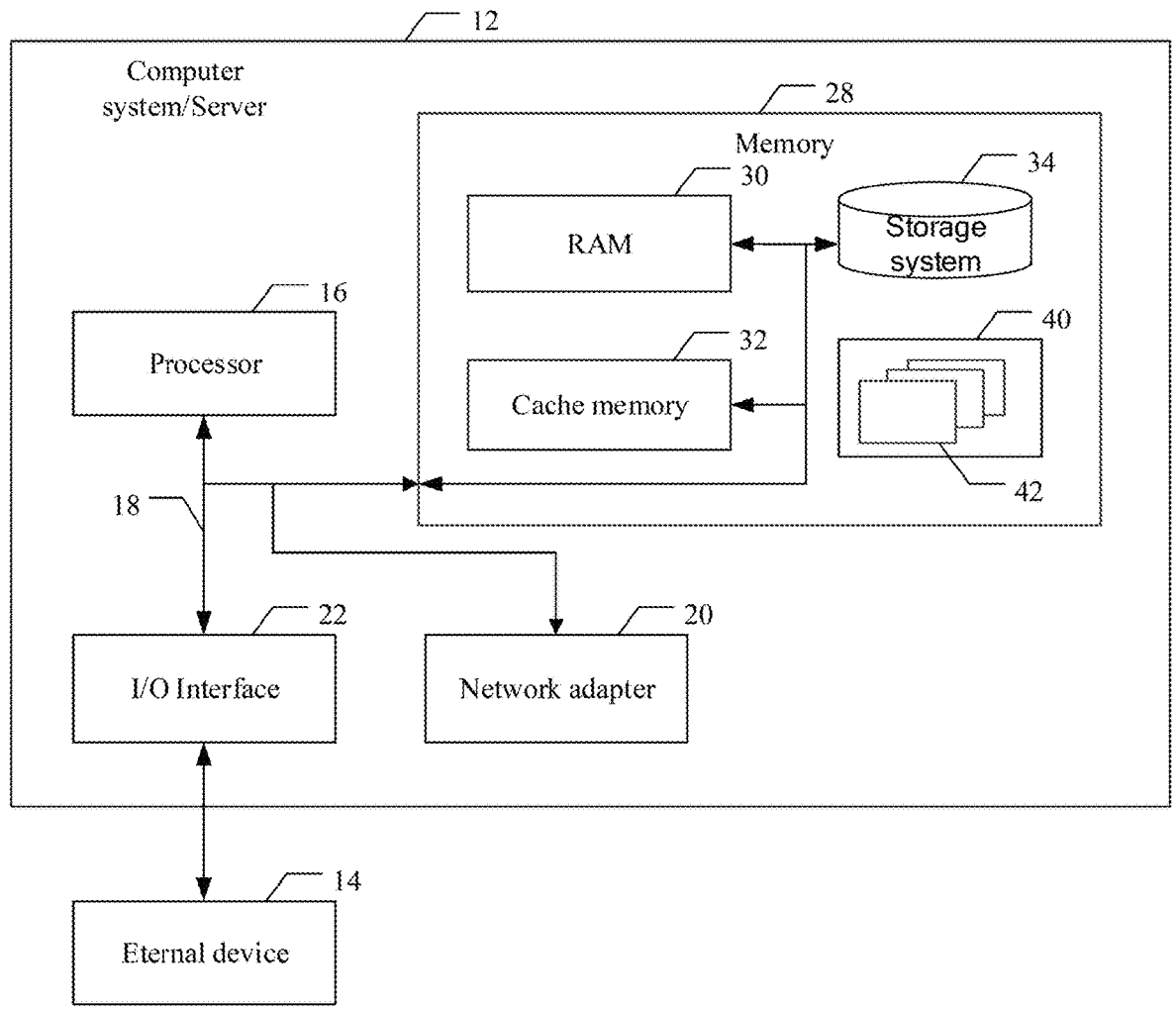
FIG. 10 illustrates a block diagram of an example computer system/server 12 adapted to implement an implementation mode of the present disclosure.

FIG. 10 illustrates a block diagram of an example computer system/server 12 adapted to implement an implementation mode of the present disclosure. The computer system/server 12 shown in FIG. 10 is only an example and should not bring about any limitation to the function and scope of use of the embodiments of the present disclosure.

As shown in FIG. 10, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 10 and typically called a "hard drive"). Although not shown in FIG. 10, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 10, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiments shown in FIG. 1.

The present disclosure meanwhile provides a computer-readable storage medium on which a computer program is stored, the program, when executed by the processor, implementing the method stated in the embodiment shown in FIG. 1.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

The invention claimed is:

1. A method for detecting a starting point and a finishing point of a speech, wherein the method comprises:
   obtaining speech data to be detected;
   segmenting the speech data into speech segments, the number of speech segments being greater than one;
   respectively determining speech states of respective speech segments based on a Voice Activity Detection model obtained by pre-training;
   determining a starting point and a finishing point of the speech data according to the speech states,
   wherein training to obtain the Voice Activity Detection model comprises:
   obtaining training speech data as training data;
   extracting sample segments in N different speech states respectively from the obtained each piece of the training speech data, N being a positive integer greater than one;
   training according to the extracted sample segments to obtain the Voice Activity Detection model, and
   the speech states comprise:
   a mute state, a starting point state, a speech retention state and a finishing point state, and
   the extracting sample segments in N different speech states respectively from the obtained each piece of the training speech data comprises:
   randomly extracting sample segments in N different speech states respectively from the obtained each piece of the training speech data;
   wherein in the sample segment in the starting point state, the starting point of the speech is located in a first half of the sample segment, and a distance from the starting point of the sample segment is greater than a predetermined threshold;
   in the sample segment in the finishing point state, the finishing point of the speech is located in a first half of the sample segment, and a distance from the starting point of the sample segment is greater than a second predetermined threshold.

2. The method according to claim 1, wherein there is overlap between at least two adjacent speech segments.

3. The method according to claim 1, wherein the Voice Activity Detection model comprises a convolutional neural network model.

4. The method according to claim 1, wherein the respectively determining speech states of respective speech segments based on a Voice Activity Detection model obtained by pre-training comprises:
   using the Voice Activity Detection model to classify the speech segments;
   based on an output of the Voice Activity Detection model, using a Viterbi decoding algorithm to determine the speech states of the speech segments.

5. The method according to claim 1, wherein the extracting sample segments in N different speech states respectively from the obtained each piece of the training speech data comprises:
   for each piece of the training speech data, obtaining speech frame and non-speech frame annotation results of the training speech data respectively;
   according to the annotation results, extracting sample segments in N different speech states from the training speech data.

6. The method according to claim 1, wherein the determining a starting point and a finishing point of the speech data according to the speech states comprises:
   determining the starting point and the finishing point of the training speech data according to a first speech segment in the starting point state and a first speech segment in the finishing point state in the training speech data.

7. A computer device, comprising a memory, a processor and a computer program which is stored on the memory and runs on the processor, wherein the processor, upon executing the program, implements a method for detecting a starting point and a finishing point of a speech, wherein the method comprises:
   obtaining speech data to be detected;
   segmenting the speech data into speech segments, the number of speech segments being greater than one;
   respectively determining speech states of respective speech segments based on a Voice Activity Detection model obtained by pre-training;
   determining a starting point and a finishing point of the speech data according to the speech states,
   wherein training to obtain the Voice Activity Detection model comprises:
   obtaining training speech data as training data;
   extracting sample segments in N different speech states respectively from the obtained each piece of the training speech data, N being a positive integer greater than one;
   training according to the extracted sample segments to obtain the Voice Activity Detection model, and
   the speech states comprise:
   a mute state, a starting point state, a speech retention state and a finishing point state, and
   the extracting sample segments in N different speech states respectively from the obtained each piece of the training speech data comprises:
   randomly extracting sample segments in N different speech states respectively from the obtained each piece of the training speech data;
   wherein in the sample segment in the starting point state, the starting point of the speech is located in a first half of the sample segment, and a distance from the starting point of the sample segment is greater than a predetermined threshold;
   in the sample segment in the finishing point state, the finishing point of the speech is located in a first half of the sample segment, and a distance from the starting point of the sample segment is greater than a second predetermined threshold.

8. A non-transitory computer-readable storage medium on which a computer program is stored, wherein the program, when executed by a processor, implements a method for detecting a starting point and a finishing point of a speech, wherein the method comprises:

obtaining speech data to be detected;

segmenting the speech data into speech segments, the number of speech segments being greater than one;

respectively determining speech states of respective speech segments based on a Voice Activity Detection model obtained by pre-training;

determining a starting point and a finishing point of the speech data according to the speech states, wherein training to obtain the Voice Activity Detection model comprises:

obtaining training speech data as training data;

extracting sample segments in N different speech states respectively from the obtained each piece of the training speech data, N being a positive integer greater than one;

training according to the extracted sample segments to obtain the Voice Activity Detection model, and the speech states comprise:

a mute state, a starting point state, a speech retention state and a finishing point state, and the extracting sample segments in N different speech states respectively from the obtained each piece of the training speech data comprises:

randomly extracting sample segments in N different speech states respectively from the obtained each piece of the training speech data;

wherein in the sample segment in the starting point state, the starting point of the speech is located in a first half of the sample segment, and a distance from the starting point of the sample segment is greater than a predetermined threshold;

in the sample segment in the finishing point state, the finishing point of the speech is located in a first half of the sample segment, and a distance from the starting point of the sample segment is greater than a second predetermined threshold.

* * * * *